(12) United States Patent
Yang

(10) Patent No.: US 6,771,851 B1
(45) Date of Patent: Aug. 3, 2004

(54) FAST SWITCHING METHOD FOR A MICRO-MIRROR DEVICE FOR OPTICAL SWITCHING APPLICATIONS

(75) Inventor: Xiao Yang, Fremont, CA (US)

(73) Assignee: Nayna Networks, Milpitas, CA (US)

( * ) Notice: Subject to any disclaimer, the term of this patent is extended or adjusted under 35 U.S.C. 154(b) by 361 days.

(21) Appl. No.: 09/884,692

(22) Filed: Jun. 19, 2001

(51) Int. Cl.$^7$ ................................................ G02B 6/35

(52) U.S. Cl. ............................ 385/18; 359/874; 385/40

(58) Field of Search ........................ 385/15–18, 39–41; 359/872, 874

(56) References Cited

U.S. PATENT DOCUMENTS

| | | |
|---|---|---|
| 4,317,611 A | 3/1982 | Petersen |
| 4,632,513 A | 12/1986 | Stowe et al. |
| 4,754,185 A | 6/1988 | Gabriel et al. |
| 4,772,085 A | 9/1988 | Moore et al. |
| 4,798,438 A | 1/1989 | Moore et al. |
| 4,834,481 A | 5/1989 | Lawson et al. |
| 4,942,766 A | 7/1990 | Greenwood et al. ........... 73/704 |
| RE33,296 E | 8/1990 | Stowe et al. |
| 4,959,699 A | 9/1990 | Lidow et al. |
| 5,147,851 A | 9/1992 | Yamana et al. |
| 5,355,426 A | 10/1994 | Daniel et al. |
| 5,378,954 A | 1/1995 | Higuchi et al. |
| 5,444,801 A | 8/1995 | Laughlin |
| 5,488,862 A | 2/1996 | Neukermans et al. .... 73/504.02 |

(List continued on next page.)

FOREIGN PATENT DOCUMENTS

| | | |
|---|---|---|
| WO | WO 99/20218 | 4/1999 |
| WO | WO99/21139 | 4/1999 |

OTHER PUBLICATIONS

Niino et al., "Dual Excitation Multiphase Electrostatic Drive," *IEEE* 0–7803–3008–0/95 pp. 1318–1324 (1995).
Niino et al., "Development of An Electrostatic Actuator Exceeding 10N Propulsive Force," *IEEE* 0–7803–0497–7/92, Micro Electro Mechanical Systems '92, Travemunde (Germany) pp. 122–127 (1992).
Niino et al., "High–Power and High–Efficiency Electrostatic Actuator," *IEEE* 0–7803–0957–2/93, pp. 236–241 (1993).
Trimmer et al., "Design Considerations For A Practical Electrostatic Micro–Motor," *Sensors and Actuators*, 11:189–206 (1997).

*Primary Examiner*—Akm Enayet Ullah
*Assistant Examiner*—Jerry T. Rahll
(74) *Attorney, Agent, or Firm*—Townsend and Townsend and Crew LLP

(57) ABSTRACT

A fast method of switching optical signals using micromirror structures and control. The method selects an optical path for a micro-mirror device, the mirror device being coupled to a torsion bar device. The micro-mirror device is moved or pivoted about a torsion bar device, the micro-mirror device being operated about the torsion bar device through an operating range. The micro-mirror device is subjected to a mechanical force from the torsion bar and being subjected an electro-static force applied to the micro-mirror device. The method positions the micro-mirror device to a selected switching location within the operating range a selected region within a predetermined time. The micro-mirror device is controlled during a portion of time during the moving by receiving position signals periodically at a predetermined frequency from a sensing device coupled to the micro-mirror device. The position signals are indicative of a position of the operating range and selectively applying an electrostatic force based upon one or more of the position signals such that the micro-mirror device is moved to the selected switching location without substantial oscillation of the micro-mirror device within the predetermined time of less than 10 milliseconds.

21 Claims, 10 Drawing Sheets

U.S. PATENT DOCUMENTS

| | | |
|---|---|---|
| 5,500,917 A | 3/1996 | Daniel et al. |
| 5,534,740 A | 7/1996 | Higuchi et al. |
| 5,555,327 A | 9/1996 | Laughlin |
| 5,555,558 A | 9/1996 | Laughlin |
| 5,566,260 A | 10/1996 | Laughlin |
| 5,627,925 A | 5/1997 | Alferness et al. |
| 5,629,790 A | 5/1997 | Neukermans et al. ....... 359/198 |
| 5,644,666 A | 7/1997 | Campbell et al. |
| 5,647,033 A | 7/1997 | Laughlin |
| 5,648,618 A | 7/1997 | Neukermans et al. |
| 5,658,710 A | 8/1997 | Neukermans |
| 5,682,453 A | 10/1997 | Daniel et al. |
| 5,693,541 A | 12/1997 | Yamazaki et al. |
| 5,721,796 A | 2/1998 | de Barros et al. |
| 5,787,214 A | 7/1998 | Harpin et al. |
| 5,835,256 A | 11/1998 | Huibers |
| 5,841,553 A | 11/1998 | Neukermans et al. ....... 358/494 |
| 5,841,916 A | 11/1998 | Laughlin |
| 5,861,549 A | 1/1999 | Neukermans et al. ......... 73/105 |
| 5,872,880 A | 2/1999 | Maynard |
| 5,875,271 A | 2/1999 | Laughlin |
| 5,881,190 A | 3/1999 | Harpin et al. |
| 5,907,650 A | 5/1999 | Sherman et al. |
| 5,909,301 A | 6/1999 | Laughlin |
| 5,917,641 A | 6/1999 | Laughlin |
| 5,943,158 A | 8/1999 | Ford et al. |
| 5,959,767 A | 9/1999 | Fatchi et al. |
| 5,960,133 A | 9/1999 | Tomlinson |
| 5,969,465 A | 10/1999 | Neukermans et al. ....... 310/333 |
| 5,986,381 A | 11/1999 | Hoen et al. |
| 6,002,514 A | 12/1999 | Barret et al. |
| 6,021,248 A | 2/2000 | Cornish et al. |
| 6,031,946 A | 2/2000 | Bergmann et al. |
| 6,044,705 A | 4/2000 | Neukermans et al. |
| 6,046,840 A | 4/2000 | Huibers |
| 6,049,644 A | 4/2000 | Dragone |
| 6,063,299 A | 5/2000 | Drake et al. |
| 6,064,779 A | 5/2000 | Neukermans et al. ....... 382/313 |
| 6,075,914 A | 6/2000 | Yeandle |
| 6,078,711 A | 6/2000 | Yeandle et al. |
| 6,088,496 A | 7/2000 | Asghari |
| 6,101,210 A | 8/2000 | Bestwick et al. |
| 6,108,118 A | 8/2000 | Minamoto |
| 6,108,472 A | 8/2000 | Rickman et al. |
| 6,108,478 A | 8/2000 | Harpin et al. |
| 6,123,985 A | 9/2000 | Robinson et al. |
| 6,175,443 B1 | 1/2001 | Aksyuk et al. |
| 6,188,814 B1 | 2/2001 | Bhalla |
| 6,204,946 B1 | 3/2001 | Aksyuk et al. |
| 6,205,267 B1 | 3/2001 | Aksyuk et al. |
| 6,215,222 B1 | 4/2001 | Hoen |
| 6,253,001 B1 | 6/2001 | Hoen |
| 6,275,326 B1 | 8/2001 | Bhalla et al. |
| 6,301,402 B1 | 10/2001 | Bhalla et al. |
| 6,304,694 B1 | 10/2001 | Ford |
| 6,392,220 B1 * | 5/2002 | Slater et al. ................ 250/216 |

\* cited by examiner

US 6,771,851 B1

FAST SWITCHING METHOD FOR A MICRO-MIRROR DEVICE FOR OPTICAL SWITCHING APPLICATIONS

BACKGROUND OF THE INVENTION

This invention generally relates to techniques for operating movement of a microstructure. More particularly, the present invention provides a method for operating movement of a micro-mirror structure coupled to a pair of torsion bars. Merely by way of example, the present invention is implemented on a micro-mirror device for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

According to the present invention, a technique including a method and apparatus for operating a mirror assembly for switching applications. More particularly, the present invention provides a method for operating movement of a micro-mirror structure coupled to a pair of torsion bars. Merely by way of example, the present invention is implemented on a micro-mirror assembly for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

As the need for faster communication networks becomes more desirable, digital telephone has progressed. Conventional analog voice telephone signals have been converted into digital signals. These signals can be 24,000 bits/second and greater in some applications. Other telephone circuits interleave these bit streams from 24 digitized phone lines into a single sequence of 1.5 Mbit/second, commonly called the T1 or DS1 rate. The T1 rate feeds into higher rates such as T2 and T3. A T4 may also be used. Single mode optical fibers have also been used at much higher speeds of data transfer. Here, optical switching networks have also been improved. An example of such optical switching standard is called the Synchronous Optical Network (SONET), which is a packet switching standard designed for telecommunications to use transmission capacity more efficiently than the conventional digital telephone hierarchy, which was noted above. SONET organizes data into 810-byte "frames" that include data on signal routing and designation as well as the signal itself. The frames can be switched individually without breaking the signal up into its components, but still require conventional switching devices.

Most of the conventional switching devices require the need to convert optical signals from a first source into electric signals for switching such optical signals over a communication network. Once the electric signals have been switched, they are converted back into optical signals for transmission over the network. As merely an example, a product called the SN 16000 is BroadLeaf™ Network Operating System (NOS) made by Sycamore Networks, Inc. uses such electrical switching technique. Numerous limitations exist with such conventional electrical switching technique. For example, such electrical switching often requires a lot of complex electronic devices, which make the device difficult to scale. Additionally, such electronic devices become prone to failure, thereby influencing a reliability of the network. The switch is also slow and is only as fast as the electrical devices. Accordingly, techniques for switching optical signals using a purely optical technology have been proposed. Such technology can use a wave guide approach for switching optical signals. Unfortunately, such technology has been difficult to scale for switching a high number of signals from a bundle of optical fibers, which may be desirable today. Other companies have also been attempting to develop technologies for switching such high number of signals, but have been unsuccessful. Such switches are also difficult to manufacture effectively and reliably. Other examples of optical switching networks include access, metropolitan and Dense Wavelength Division Multiplexing (DWDM) networks.

As merely an example, some companies have been attempting to use mirrors to switch an optical beam from one fiber to another. The use of mirrors in telecommunication signals has some advantages such as low signal loss and the like. Such mirrors, however, are often difficult to manufacture in a high density mirror array. In particular, such mirrors are often fragile and prone to damage during fabrication. U.S. Pat. No. 5,969,465, assigned to XROS, Inc. describes such a mirror, which is often difficult to make and operate high density array structures. Such mirrors can often only operate in a stable region through electrostatic force. Such stable region generally provides a limited amount of movement of the mirror through a spatial region, which limits its switching effectiveness. Accordingly, it is often difficult to use such a mirror design to operate high density arrays.

From the above, it is seen that an improved way for operating movement of a mirror assembly for switching a signal is highly desirable.

SUMMARY OF THE INVENTION

According to the present invention, a technique including a method and apparatus for operating a mirror assembly for switching applications. More particularly, the present invention provides a method for operating movement of a micro-mirror structure coupled to a pair of torsion bars. In an exemplary embodiment, the invention provides a method for operating an unstable micro-opto-electro mechanical systems (i.e., MOEMS). Merely by way of example, the present invention is implemented on a micro-mirror device for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like.

In a specific embodiment, the invention provides a method of switching optical signals using micro-mirror structures and control. The method selects an optical path for a micro-mirror device, the mirror device being coupled to a torsion bar device. The micro-mirror device is moved or pivoted about a torsion bar device, the micro-mirror device being operated about the torsion bar device through an operating range including a stable region and an unstable region. The micro-mirror device is subjected to a mechanical force from the torsion bar and being subjected an electrostatic force applied to the micro-mirror device. The method positions the micro-mirror device to a selected switching location within the operating range through the stable region and to a selected region within the unstable region within a predetermined time. The micro-mirror device is controlled during a portion of time during its movement by receiving position signals periodically at a predetermined frequency from a sensing device coupled to the micro-mirror device. The position signals are indicative of a position of the operating range and selectively applying an electrostatic force based upon one or more of the position signals such that the micro-mirror device is moved to the selected switching location without substantial oscillation of the micro-mirror device within the predetermined time of less than 10 milliseconds.

Many benefits are achieved by way of the present invention over conventional techniques. For example, the present technique provides an easy to use process that relies upon conventional technology. The present invention provides a novel way of controlling and operating a MOEMS, which can include a micro-mirror assembly. In one aspect, the invention allows for high scale integration of mirror devices to form high density and performance switching devices. Such switching device can include more than 10 (ten) mirror elements. In some embodiments, such switching devices can include more than 200 (two hundred) or even thousands (one thousand to four thousand and greater) mirror elements for switching respective signals for optical switching applications. The invention also provides for a stable switch position during operation for a MOEMS, which may be subjected to internal and/or external noise from a mechanical (e.g., vibration, shock), thermal, gravitational or electrical force or forces. Such forces can be detrimental to precise switching requirements of the MOEMS for optical switching applications in optical networking applications. The present feed back control can also provide for stable operation that may be related to drift caused by electrical, mechanical, and/or thermal. The invention can also take into account degradations over a lifetime of a switching device, which may be prone to fatigue or the like. In preferred embodiments, the present system has stable operating performance (e.g., low bit error rates, low dB losses, low insertion losses) due to the feed back process. The present control system can be used to reduce switching time (e.g., less than 20 milliseconds) as compared to conventional open loop configurations, which often oscillate and cannot find a stable position efficiently. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, a technique including a method and apparatus for operating a mirror assembly for switching applications. More particularly, the present invention provides a method for operating movement of a micro-mirror structure coupled to a pair of torsion bars. Merely by way of example, the present invention is implemented on a micro-mirror assembly for switching an optical signal, but it would be recognized that the invention has a much broader range of applicability. The mirror can be used in a switching device for long haul communications. The invention can be applied to other types of networks including local area networks, enterprise networks, small switch designs (e.g., two by two) and the like. Other applications that describe operation, method, and apparatus of the present inventions are described in following applications, which are hereby incorporated by reference to each other for all purposes.

1. U.S. Ser. No. 09/847,870 entitled METHOD FOR OPERATING A MICRO-MIRROR ASSEMBLY FOR OPTICAL SWITCHING APPLICATIONS, commonly assigned, and hereby incorporated by reference for all purposes;

2. U.S. Ser. No. 09/847,868 entitled METHOD FOR TRANSPARENT FOR SWITCHING AND CONTROLLING OPTICAL SIGNALS USING MIRROR DESIGNS, commonly assigned, and hereby incorporated by reference for all purposes;

3. U.S. Ser. No. 09/847,921 entitled OPERATION OF HIGH DENSITY MEMS DEVICE USING DIGITAL SIGNAL PROCESSING, commonly assigned, and hereby incorporated by reference for all purposes; and 4. U.S. Ser. No. 09/847,890 entitled SYSTEM AND COMPUTER CODE FOR OPERATING A MICRO-MIRROR ASSEMBLY FOR OPTICAL SWITCHING APPLICATIONS, commonly assigned, and hereby incorporated by reference for all purposes.

Figure 1:
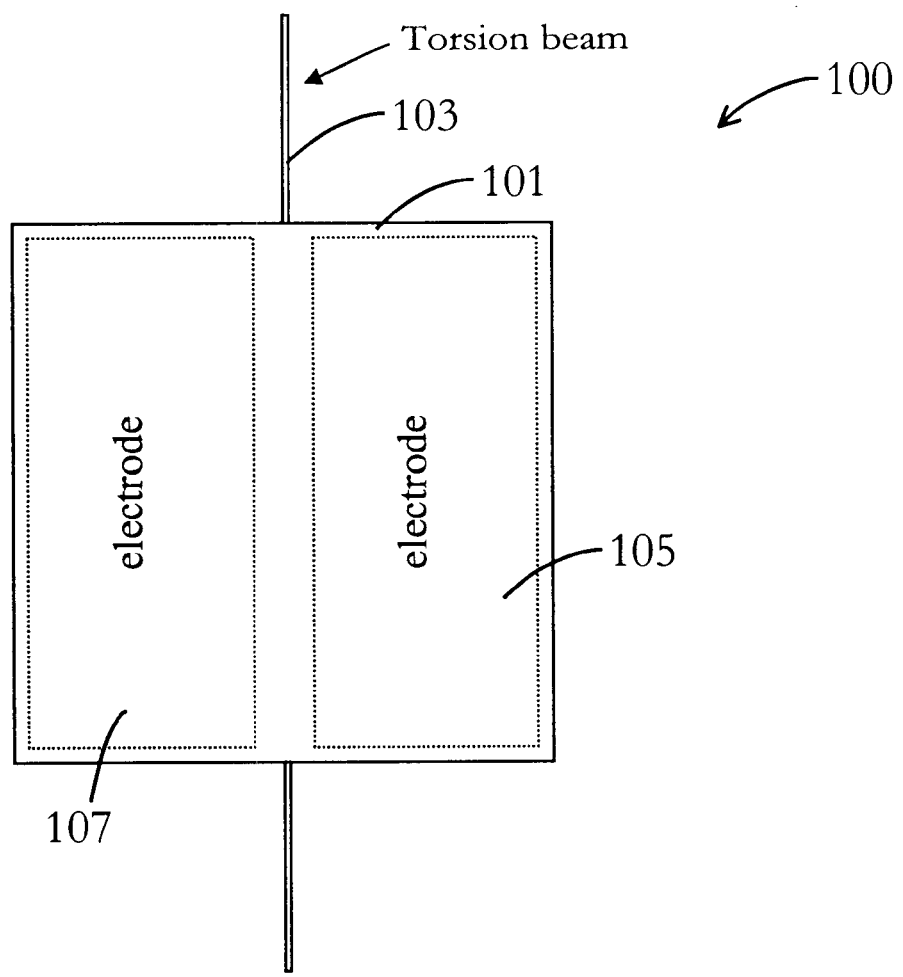
FIG. 1 is a simplified block diagram of a system according to an embodiment of the present invention.

FIG. 1 is a simplified block diagram of a system 100 according to an embodiment of the present invention. This diagram is merely an illustration and should not unduly limit the scope of the invention defined by the claims herein. One of ordinary skill in the art would recognize many other variations, alternatives, and modifications. As shown, FIG. 1 illustrates a top view diagram 100 of a mirror assembly. The assembly 100 includes a mirror surface structure 101 coupled between two torsion bars 103. The mirror surface structure can be made of a variety of materials including silicon, aluminum, nickel, any combination of these, and the like, for example. The surface may also be coated with a reflective material. The reflective material can include gold and other suitable materials. Other materials include aluminum, nickel, and other suitable metals or semiconductors. In a specific embodiment, the substrate is made using the technique described in U.S. Ser. No. 60/270,404 filed Feb. 20, 2001, commonly assigned and hereby incorporated by reference for all purposes. Underlying the mirror structure is a pair of electrodes, 105, 107. The electrodes are spatially disposed along each side of the mirror and each side of the torsion bar. The electrodes are subjected to a voltage or voltages, which move the mirror in a pivotal fashion along the torsion bar. Further details of such a mirror movement can be found throughout the present specification and more particularly below. Although the present specification is described in terms of a specific mirror structure, it should be noted that the mirror and electrode configuration can vary depending upon the embodiment.

Figure 2:
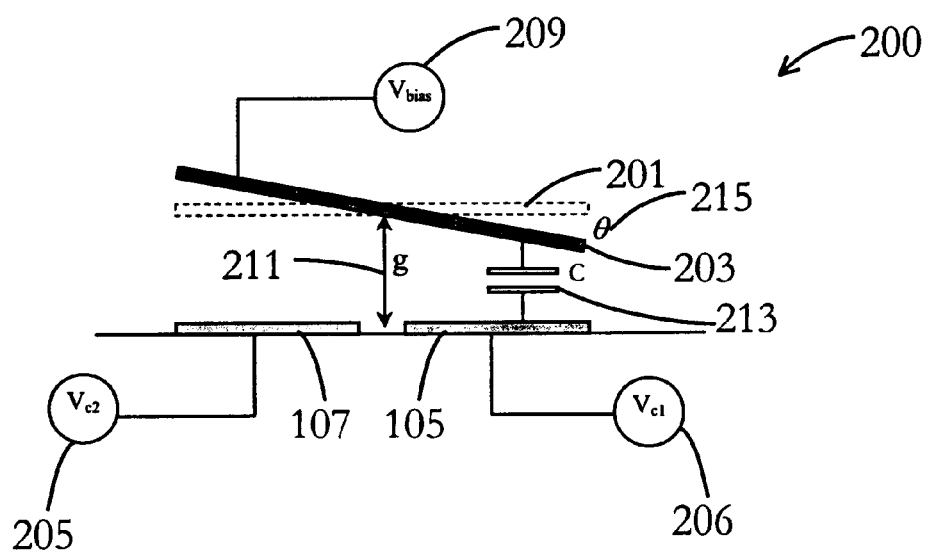
FIG. 2 is a simplified diagram of a system according to an embodiment of the present invention.

FIG. 2 is a simplified diagram of a system 200 according to an embodiment of the present invention. This diagram is merely an illustration and should not unduly limit the scope of the invention defined by the claims herein. One of ordinary skill in the art would recognize many other variations, alternatives, and modifications. As shown, the drive electrodes 105, 107 are disposed on a substrate. A first applied voltage 206 is applied to electrode 105. A second applied voltage 205 is applied to electrode 107. A bias 209 is also applied, which reduces overall drive voltage. Such applied voltages are controlled through a controller (not shown). The mirror pivots about the torsion bar and moves from a normal position 201, through angle theta 215, to a desired switching position 203. The desired switching position can be located at an unstable region such as a pull-in region of conventional open loop circuits. Here, the mirror pivots through a stable region and an unstable region to the unstable position. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor. In a specific embodiment, the sensor can be a capacitance sensor 213, which is coupled between the mirror and the electrodes or other substrate structure. In other embodiments, the sensor can also be any type of device that provides position information of the mirror. Such sensor can be mechanical, electrical, optical, any combination of these and the like. A relationship between mirror position and applied drive voltage can be found in more detail below.

Figure 3:
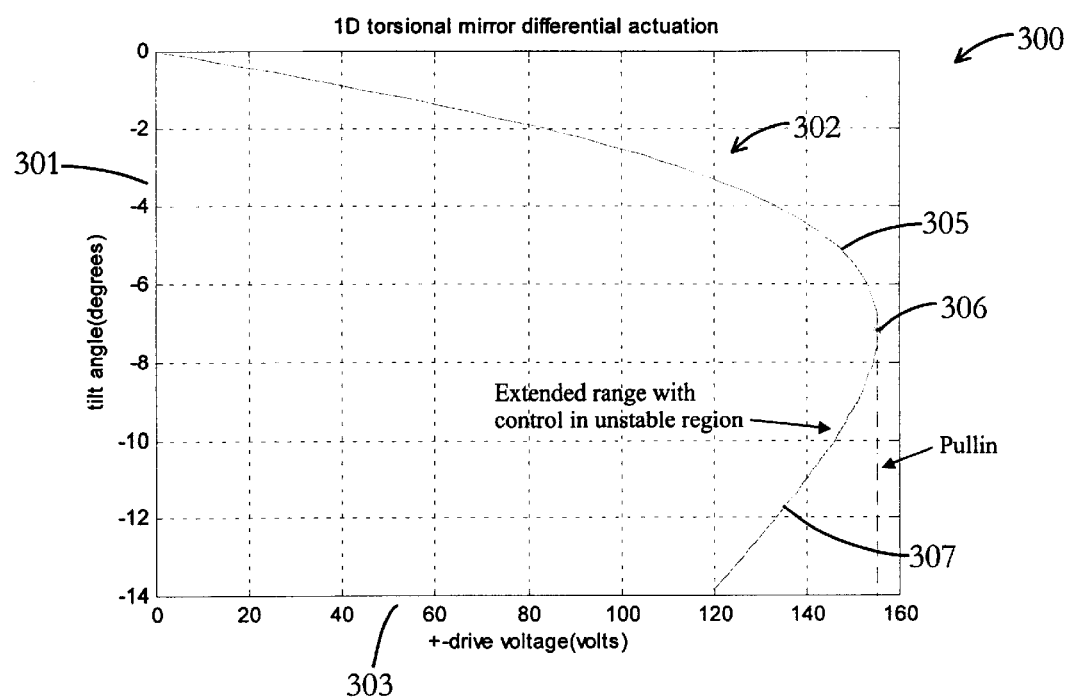
FIG. 3 is a simplified block diagram illustrating more details of the system according to an embodiment of the present invention.

FIG. 3 is a simplified block diagram 300 illustrating more details of the system 300 of FIG. 1 according to an embodiment of the present invention. This diagram is merely an illustration and should not unduly limit the scope of the invention defined by the claims herein. One of ordinary skill in the art would recognize many other variations, alternatives, and modifications. To illustrate the mirror position through the stable region an unstable region, we have prepared the simplified diagram 300. As shown, the vertical axis represents tilt angle in degrees. The tilt angle varies from zero, which is the normal position, to −10 degrees, which is a desired switching position (from a number of such switching positions) in the unstable region. The horizontal axis represents drive voltage, which ranges from zero to 160 Volts. The diagram 302 includes a stable region, which extends from 0 degree at zero Volt to about a −7 degrees at 160 Volts. The point illustrated by reference numeral 306 represents an inflection point. After such inflection point, the operating range of the mirror becomes unstable, which is defined by the angles greater than −7 degrees. Such an unstable region is also defined as the pull-in region. In the pull-in region, the amount of voltage necessary to pivot the mirror decreases from the smaller gap between the drive electrodes and the mirrors, which increases the electrostatic force.

The above figure describes aspects of the invention illustrated by elements in simplified system diagrams. As will be understood by one of ordinary skill in the art, the elements can be implemented in computer hardware. The elements can also be implemented, in part, through computer software or firmware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A simplified method according to the present invention may be outlined as follows:

1. Set mirror, which is coupled to a control block;
2. Determine present angular position from a sensor coupled to the mirror;
3. Provide signal from a user interface to set mirror to desired angular position, which is different from the present angular position;
4. Determine error between the present angular position and the desired angular position;
5. Transfer error into the control block;
6. Form signal from control block to provide movement of the mirror to the desired angular position;
7. Generate driving voltage from the signal to move the mirror from the present angular position to the desired angular position;
8. Repeat the above steps to correct in any differences between the actual mirror position and the desired angular position; and
9. Perform other steps, as desired.

The above sequence of steps provides a way of overseeing and controlling a micro-mirror device. Such steps include using feedback control from a position sensor coupled to the mirror device for controlling the mirror through stable and even unstable operating regions. By way of the feedback, it is possible to operate the mirror through a much wider range of angles, which allows for more efficiency in switching and the like in a rapid manner without undue correction of the mirror position. Preferably, the mirror operates through a much wider range of angles than a conventional open loop configuration. Further details of the above steps are provided more fully throughout the specification and more particularly below.

Figure 4:
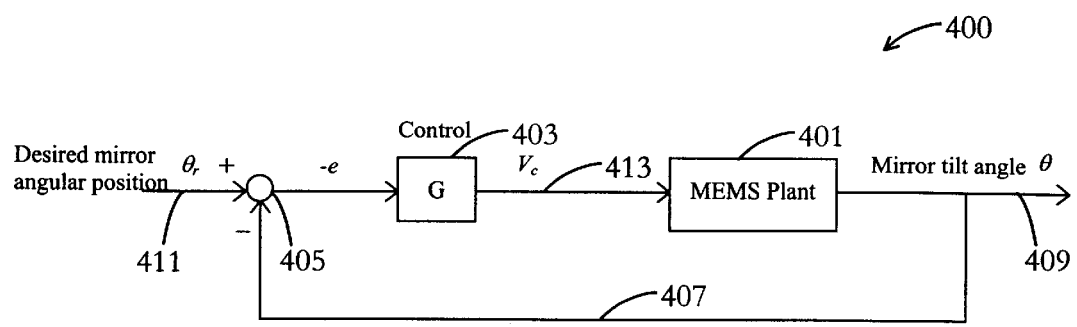
FIG. 4 is a simplified high level control diagram according to an embodiment of the present invention.

FIG. 4 is a simplified high level control diagram 400 according to an embodiment of the present invention. This diagram is merely an illustration and should not unduly limit the scope of the invention defined by the claims herein. One of ordinary skill in the art would recognize many other variations, alternatives, and modifications. As shown, the control diagram 400 includes a variety of elements such as a MEMS plant 401. The MEMS plant can include a micromirror assembly, such as the one described above, but can also be others. For example, the assembly includes a mirror surface structure coupled between two torsion bars. The mirror surface structure can be made of a variety of materials including silicon, for example. The surface may also be coated with a reflective material. The reflective material can include gold, aluminum, or other suitable reflective materials. Underlying the mirror structure is a pair of electrodes.

Here, the term "underlying" does not have a specific reference to a direction of a gravity force. The electrodes are spatially disposed along each side of the mirror and each side of the torsion bar. The electrodes are subjected to a voltage or voltages, which move the mirror in a pivotal fashion along the torsion bar via the electrostatic force. Alternatively, the mirror structure can be adjacent to or merely coupled to electrodes.

In a specific embodiment, the drive electrodes are disposed on a substrate. A first applied voltage is applied to the first electrode. A second applied voltage is applied to a second electrode. Such applied voltages are controlled through a controller. The mirror pivots about the torsion bar and moves from a normal position, through angle theta, to a desired switching position. The desired switching position can be located at an unstable position, but can also be in a stable position. Here, the mirror pivots through a stable region and through an unstable region to a position within the unstable region. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor, which is coupled to a voltage bias. The MEMS plant is coupled to a feedback loop 407, which includes control block 403. The control block couples to the MEMS plant through line 413. A desired mirror set point in angular coordinates can be provided to the control block through line 411. Tilt angle can be outputted through line 409. In a specific embodiment, the present invention includes a method, which is carried out using the subject control diagram. Specific details with regard to a method according to an embodiment of the present invention are provided below.

The method sets the mirror position. The mirror is coupled to a control block that will be used to provide control to the mirror. The mirror is first set to a first angular position, which may be almost any starting position, including an intermediate position. The method determines the first angular position from a sensor coupled to the mirror. Such sensor has been described above. The first angular position is obtained from the sensor and is often fed into a controller or the like or other output device.

Next, the method provides a signal 411 from a user interface coupled to the controller to set the mirror to second angular position, which is different from the first angular position. In a specific embodiment, the user interface can be implemented in a manual, semi-automatic, or automatic switching configuration, which indicates switching a signal using the mirror at the first angular position to the second angular position. The method determines an error between the first angular position and the second angular position. Preferably, the error is the difference between the present position and the target position, which are respectively the first and second angular positions. Next, the method transfers the error into the control block 403. The control block forms an output signal to provide physical movement of the mirror to the second angular position.

In a specific embodiment, the control block generates a signal to generate a selected voltage, which has a corresponding magnitude. The selected voltage is applied to one or more of the electrodes coupled to the mirror. Such electrodes provide an electrostatic force or forces that move the mirror from the first angular position to the second angular position. Off setting some of the force would be a counter force provided by the spring force of the torsion bars, which couple the mirror device. The spring force varies as the mirror moves through the stable region and through the unstable region, as shown above. The method then repeats one or more of the above steps to correct in any difference between the actual mirror position and the desired second angular position.

The above figures describe aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A simplified method according to an alternative embodiment of the present invention may be outlined as follows:

1. Set mirror device to first angular position (e.g., present position);
2. Determine first angular position from a sensor coupled to the mirror;
3. Provide signal from a user interface to set mirror to second angular position (e.g., target position), which is different from the first angular position;
4. Determine error between the first angular position and the second angular position;
5. Feed error into a digital signal processing module, which is running an algorithm;
6. Determine a digital output value based upon the algorithm in the digital signal processing module;
7. Convert the digital output value into an analog signal;
8. Amplify the analog signal, which will be used to drive the electrode or electrodes coupled to the mirror;
9. Apply voltage to the electrodes based upon the analog signal;
10. Move mirror based upon applied voltage toward desired position;
11. Monitor position of the mirror using analog signals from sensing device as it moves toward the desired position;
12. Convert analog signals from the sensing device;
13. Process analog signals from the sensing device;
14. Convert analog signals into digital signals;
15. Repeat the above steps to correct in any difference between the actual mirror position and the desired angular position; and
16. Perform other steps, as desired.

The above sequence of steps provides a way of overseeing and controlling a micro-mirror device. Such steps include using feedback control from a position sensor coupled to the mirror device for controlling the mirror through stable and unstable operating regions. The steps also provide for signal processing to allow for efficient and stable operating of the mirror device. By way of the feedback and signal processing, it is possible to operate the mirror through a much wider range of angles, which allow for more efficiency in switching and the like. Preferably, the mirror operates through a much wider range of angles than a conventional open loop configuration. Further details of the above steps are provided more fully throughout the specification and more particularly below.

Figure 5:
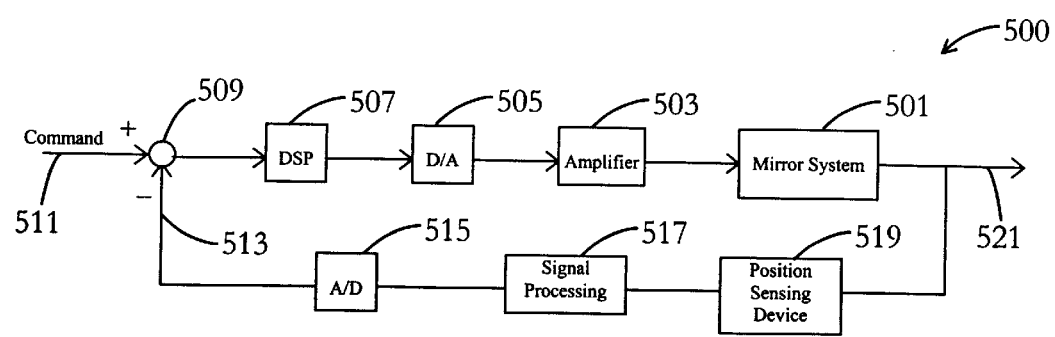
FIG. 5 is a simplified diagram of a feedback control diagram according to an embodiment of the present invention.

FIG. 5 is a simplified diagram of a feedback control diagram 500 according to an embodiment of the present invention. This diagram is merely an illustration and should not unduly limit the scope of the invention defined by the claims herein. One of ordinary skill in the art would recognize many other variations, alternatives, and modifications. As shown, the control diagram 500 includes a variety of elements. Such elements include, among others, a MEMS plant 501, which has an output 521. The MEMS plant includes a mirror device, such as the one above, but can be others. The output loops back into a position-sensing device 519, which is coupled to a signal-processing device 517. The signal-processing device sends analog signals to a converter 515. The converter is an analog to digital converter. The digital signal is fed back into an adder 509 via branch 513. Adder 509 is adapted to receive command signal 511. The difference or error is calculated with the digital signal-processing device 507, which couples to a digital to analog converter 505. The digital signal from the processing device is converted into an analog signal, which is then amplified through amplifier 503. The final analog signal is used to drive electrode devices in the MEMS plant.

As noted The MEMS plant can include a micro-mirror assembly, such as the one described above, but can also be others. For example, the assembly includes a mirror surface structure coupled between two torsion bars. The mirror surface structure can be made of a variety of materials including silicon, for example. The surface may also be coated with a reflective material. The reflective material can include gold and other suitable materials. Underlying the mirror structure is a pair of electrodes. The electrodes are spatially disposed along each side of the mirror and each side of the torsion bar. The electrodes are subjected to a voltage or voltages, which move the mirror in a pivotal fashion along the torsion bar.

In a specific embodiment, the drive electrodes are disposed on a substrate. A first applied voltage is applied to the first electrode. A second applied voltage is applied to a second electrode. Such applied voltages are controlled through a controller. The mirror pivots about the torsion bar and moves from a normal position, through angle theta, to a desired switching position. The desired switching position can be located at an unstable position, but can also be in a stable position: Here, the mirror pivots to a stable region and an unstable region to the unstable position. The stable region is characterized where the spring force from the torsion bar can off set or is equal to the driving force from the electrode. The unstable region is characterized with the spring force from the torsion bar being less than the driving force from the electrode. The spring force cannot off set the driving force, which causes the mirror to pull in and to deflect toward the mechanical stop and hit it in an uncontrollable manner, for example, which is detrimental to an operation for switching optical signals. A position of the mirror can be monitored by way of a sensor, which is coupled to a voltage bias. The MEMS plant is coupled to a feedback loop, which includes a control block. The control block couples to the MEMS plant. A desired mirror set point in angular coordinates can be provided to the control block. Tilt angle can be outputted. In a specific embodiment, the present invention includes a method, which is carried out using the subject control diagram. Specific details with regard to a method in the control block according to an embodiment of the present invention are provided below.

In a specific embodiment, the method first sets a mirror device to first angular position. The mirror is first set to a first angular position, which may be almost any starting position, including an intermediate position. The method determines the first angular position from a sensor coupled to the mirror. Such sensor has been described above. The first angular position is obtained from the sensor and is often fed into a controller or the like or other output device.

Next, the method provides a signal 511 from a user interface coupled to the controller to set the mirror to second angular position, which is different from the first angular position. In a specific embodiment, the user interface can be implemented in a manual, semi-automatic, or automatic switching configuration, which indicates switching a signal using the mirror at the first angular position to the second angular position. The method determines an error between the first angular position and the second angular position.

The error is fed from the adder 509 into a digital signal processing module, which is running an algorithm. An example of a control algorithm is provided more fully below, but is not limited. The method determines a digital output value based upon the algorithm in the digital signal processing module. The digital output value is converted into an analog signal in the digital to analog converter 505. The analog signal is amplified in amplifier 503. The amplified signal will be used to drive the electrode or electrodes coupled to the mirror. The amplified signal includes a voltage, which is applied to the one or more electrodes in the MEMS plant 501. The MEMS plant has the mirror, which couples to the one or more electrodes.

The mirror moves or pivots based upon the applied voltage toward a desired position. The position of the mirror is monitored using analog control signals from sensing device 519 as it moves toward the desired position. The analog signals from the sensing device are processed in a predetermined manner. Such signal processing occurs in the signal processing device 517. Next, the processed analog signals are converted into digital signals using the analog to digital converter 515. Such digital signals are transferred into the adder 509 via branch 513. The adder determines any difference between the actual mirror position and the desired angular position and goes through the above steps to correct for any difference.

The above figure describes aspects of the invention illustrated by elements in simplified system diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware. Alternatively, some of the elements may be combined together or even separated. Additionally, discrete digital and/or analog components can also be used. These and other variations, modifications, and alternatives will be apparent by one of ordinary skill in the art. Further details of methods according to embodiments of the present invention can be found throughout the present specification and more particularly below.

A fast switching method according to the present invention can be outlined as follows:

1. Set mirror device to first angular position (e.g., present position);

2. Determine first angular position from a sensor coupled to the mirror;
3. Provide signal from a user interface to set mirror to second angular position (e.g., target position), which is different from the first angular position;
4. Determine error between the first angular position and the second angular position;
5. Feed error into a digital signal processing module, which is running an algorithm;
6. Determine a digital output value based upon the algorithm in the digital signal processing module;
7. Convert the digital output value into an analog signal;
8. Amplify the analog signal, which will be used to drive the electrode or electrodes coupled to the mirror;
9. Apply voltage to the electrodes based upon the analog signal;
10. Move mirror based upon applied voltage from the first position toward desired position, while monitoring position of the mirror using analog signals from sensing device as it moves toward the desired position within a predetermined amount of time without substantial oscillation;
11. Repeat the above steps to correct in any difference between the actual mirror position and the desired angular position; and
12. Perform other steps, as desired.

The above sequence of steps provides a way of overseeing and controlling a micro-mirror device from a first position to a second position within a predetermined amount of time. Such steps include using feedback control from a position sensor coupled to the mirror device for controlling the mirror through stable and unstable operating regions. The steps also provide for signal processing to allow for efficient and stable operating of the mirror device. By way of the feedback and signal processing, it is possible to operate the mirror to switch it from a first position to a second position within a predetermined amount of time and without substantial oscillation. Further details of the above steps are provided more fully throughout the specification and more particularly below.

Figure 6:
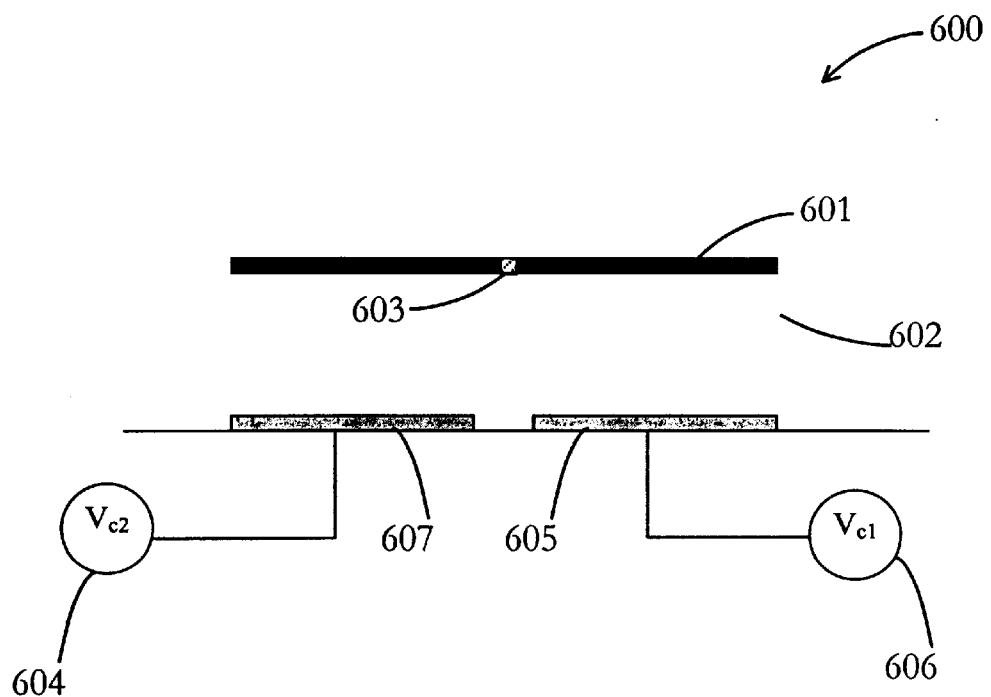
FIG. 6 is a simplified diagram of a conventional system.
Figure 7:
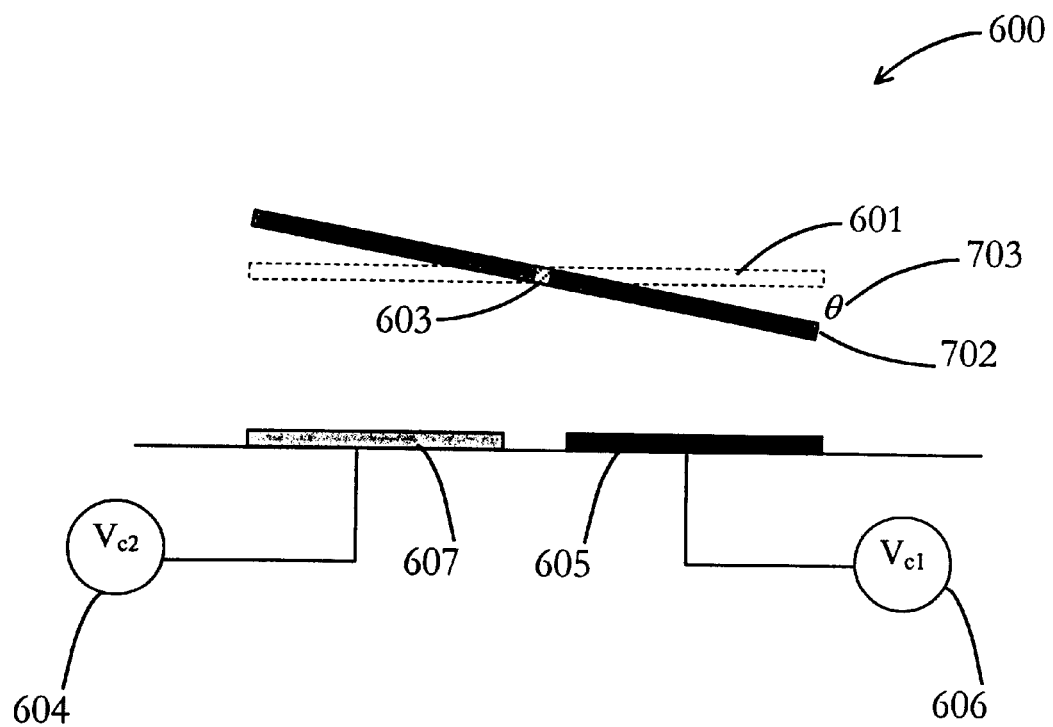
FIG. 7 is a simplified diagram of the conventional system of FIG. 6 in an operating mode.

Before describing aspects of the present invention, it may assist the reader to fully understand the limitations of the conventional systems, which we have discovered. Such limitations are provided in more detail with reference to the figures below. FIG. 6 is a simplified diagram of a conventional system 600. The conventional system 600 includes a variety of elements such as a plurality of electrodes 605, 607, which drive mirror device 601. The mirror device pivots about axis 603, which is often a torsion bar or other spring means. Each of the electrodes couple to a respective voltage supply 604, 606. The voltage supply is provided to form electrostatic force between the electrode and mirror, which causes the mirror to actuate about the axis. In one configuration, the mirror is substantially parallel to the electrodes, as shown by reference numeral 606. The mirror is operated in an open loop configuration, where a mechanical resistance of the torsion bar is used to off set a drive force formed by the electrode or electrodes. The mirror actuates through angle theta shown by reference numeral 703 to position shown by reference numeral 702, as shown in the simplified diagram of FIG. 7. The electrostatic force from the electrodes drives the mirror to position 702 while a mechanical spring force opposes such electrostatic force to off set such force.

Figure 8:
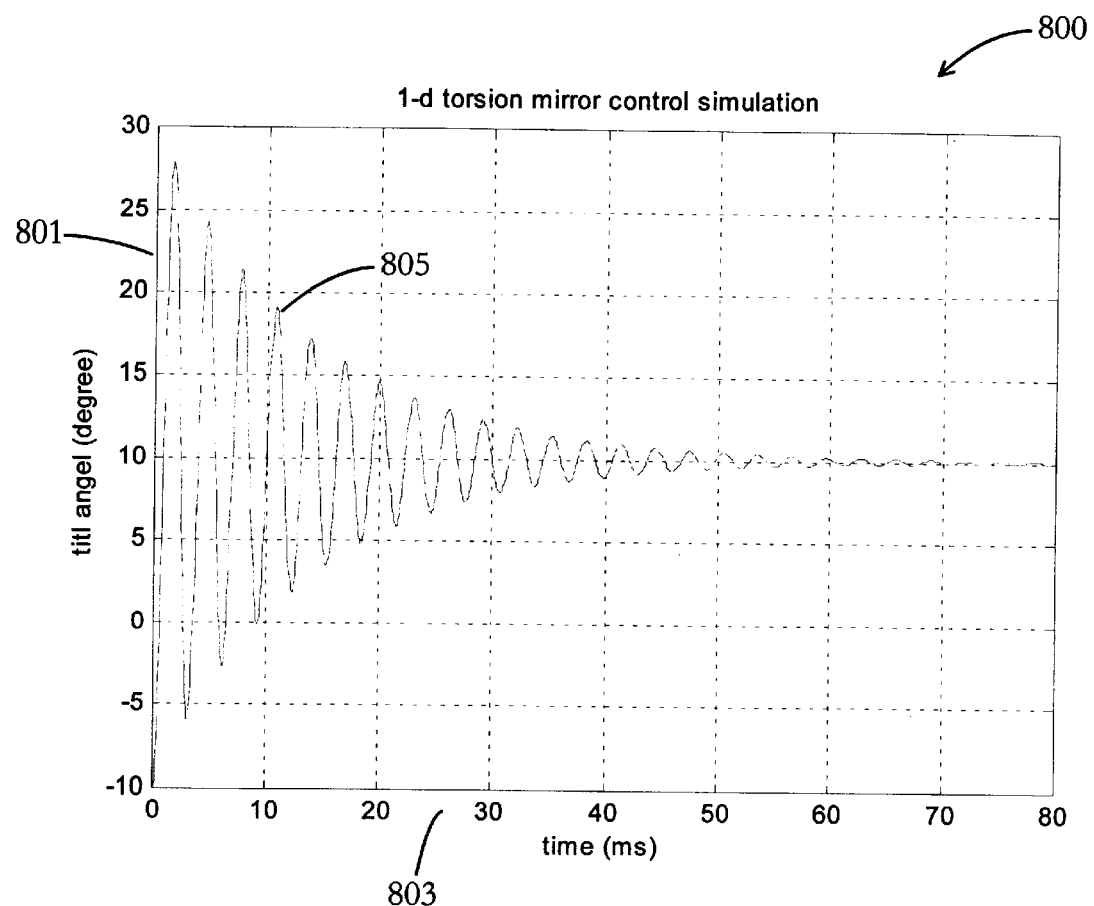
FIG. 8 is a simplified diagram illustrating a method of operation of the conventional system of FIG. 6.

Unfortunately, conventional systems often have difficulty achieving equilibrium where the mechanical and electrostatic forces off set each other. FIG. 8 is a simplified diagram, which plots mirror position against time, of the conventional systems of FIGS. 6 and 7 in an operating mode, which shows such difficulty. Such difficulty causes unreliability of the switching position during operation of the conventional systems. As shown, the plot diagram includes a vertical axis 801, which represents tilt angle of the mirror or mirror position along a spatial dimension. The horizontal axis 803 represents time in milliseconds. Once the mirror actuates from a first position, such as the position in FIG. 6, to a second position, such as the position in FIG. 7, the position of the mirror is unstable 805 and oscillates about a spatial position. In conventional open loop configurations, it often takes more than 70 milliseconds for the mirror to settle down and rest at a selected predetermined position.

Figure 9:
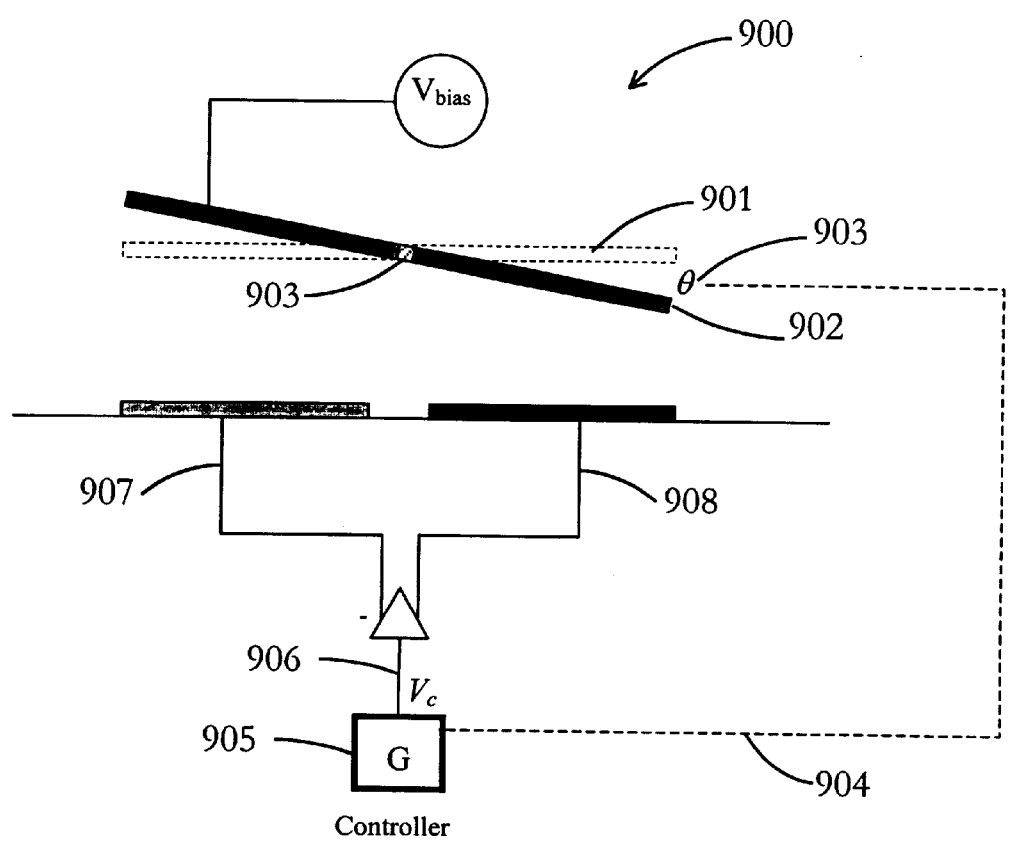
FIG. 9 is a simplified diagram of a system according to an embodiment of the present invention.

FIG. 9 is a simplified diagram 900 of a system according to an embodiment of the present invention. This diagram is merely an example, which should not unduly limit the scope of the invention defined by the claims herein. One of ordinary skill in the art would recognize many other variations, alternatives, and modifications. As shown, the diagram includes a mirror structure, which pivots about a torsion bar 903. The mirror has a first spatial position 901, traverses through angle theta 903, and switches to a second spatial position 902. The electrodes are coupled to sensing devices that monitor the spatial position of the mirrors through the angles. The sensing devices feed back position information through line 904 to controller 905. The controller receives the information from the sensing devices, processes the information, and provides a control signal or signals 906 to the actuation devices, which are electrodes. The control signal or signals are digital and converted to analog drive signals through lines 907, 908, which are respectively coupled to the electrodes. In a specific embodiment, the system uses any of the control systems and methods described herein, but can be others.

In a specific embodiment, the system also applies a back bias 911 to the mirror. The back bias is selectively applied to the mirror to reduce the amount of voltage used by the electrodes. The back bias is preferably about 200 or 100 volts and less. The back bias reduces the overall voltage often needed to actuate the mirror by about 30% and greater. The back bias is often a constant but can also be variable in some applications. The bias also improves the slew rate of the switching system. Preferably, such improvement occurs in a proportional manner, but can also be in other ways. We understand that the switching time can be related to the slew rate. According to the present invention, the system actuates the mirror from the first spatial position to the second spatial position without substantial oscillation of conventional systems.

Figure 10:
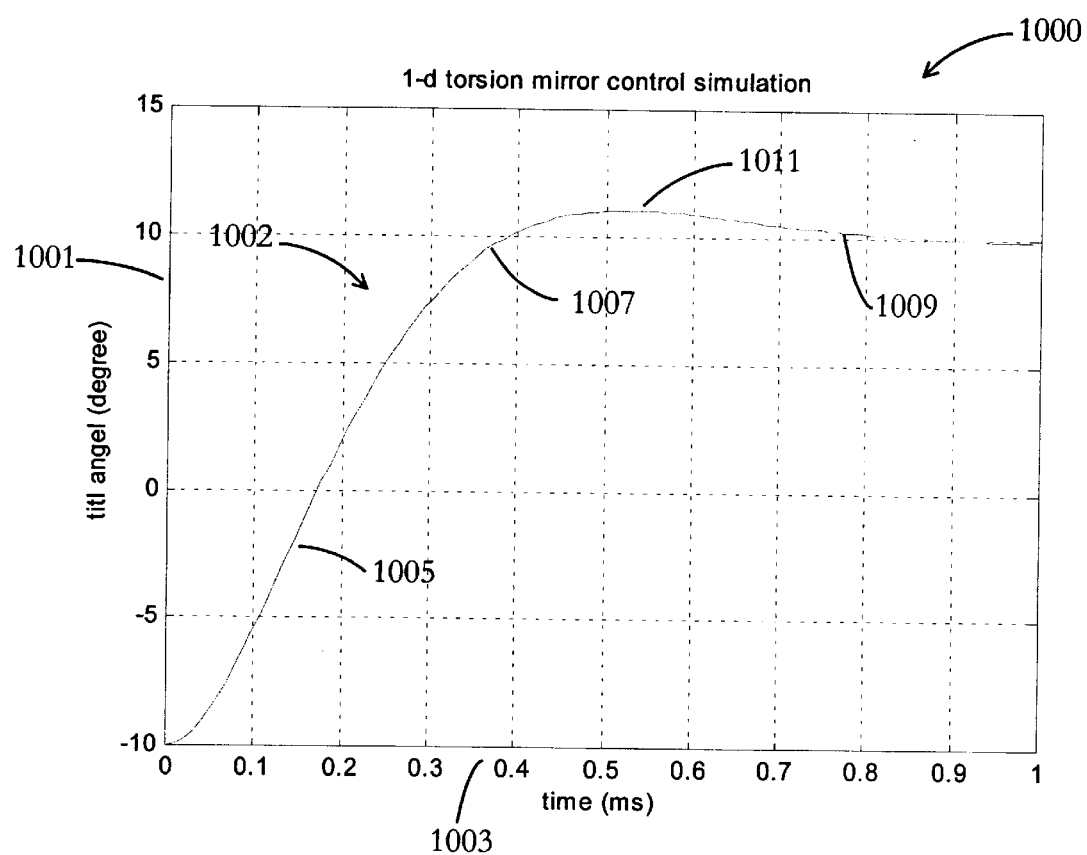
FIG. 10 is a simplified diagram illustrating a method of operation of the system of FIG. 9

FIG. 10 is a simplified diagram illustrating a method of operation of the system of FIG. 9. This diagram is merely an illustration and may not limit the scope of the claims herein. One of ordinary skill in the art would recognize many other variations, modifications, and alternatives. As shown, the diagram includes a vertical axis, which represents mirror position that is tilt angle 1001. The diagram also includes a horizontal axis 1003, which represents time in milliseconds. As shown, the mirror actuates from a first spatial position to a second spatial position. The mirror moves from these positions without substantial oscillation and overshoot of conventional systems. The mirror begins at a tilt angle of −10 degrees as measured from some predetermined position. The mirror moves in a linear manner 1005 from the first position to a second position, which is about 10 degrees. The mirror often moves through 007 the second position, overshoots 1011 in a slight manner, and rests at the second position within 0.9 milliseconds. In some embodiments, the mirror can undershoot in a slight manner and then rest at the second position within 0.9 milliseconds. Of course, the exact time and way the mirror moves depends upon the particular application.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of switching optical signals using micro-mirror structures and control, the method comprising:

selecting an optical path for a micro-mirror device, the mirror device being coupled to a torsion bar device;

moving the micro-mirror device about a torsion bar device, the micro-mirror device being operated about the torsion bar device through an operating range, the micro-mirror device being subjected to a mechanical force from the torsion bar and being subjected to an electro-static force applied to the micro-mirror device and positioning the micro-mirror device to a selected switching location within the operating range to a selected region within a predetermined time; and controlling the micro-mirror device during a portion of time during the moving by receiving position signals periodically at a predetermined frequency from a sensing device coupled to the micro-mirror device, the position signals being indicative of a position of the operating range and selectively applying an electro-static force based upon one or more of the position signals such that the micro-mirror device is moved to the selected switching location to form the optical path without substantial oscillation of the micro-mirror device within the predetermined time of less than 10 milliseconds, wherein the electro-static force and the torsion force are equal to zero at the selected switching location.

2. The method of claim 1 wherein the controlling reduces the electro-static forces from an electrode coupled to the micro-mirror device.

3. The method of claim 1 wherein the predetermined time is less than about 1 millisecond.

4. The method of claim 1 wherein the sensing device is selected from an optical sensor, mechanical sensor, or an electrical sensor.

5. The method of claim 1 Wherein the selected frequency is 6 kHz and greater.

6. The method of claim 1 wherein the micro-mirror device has a mirror surface having a diameter of less than 3 millimeters.

7. The method of claim 1 wherein the controlling is provided at a time period of less than 20 microseconds.

8. The method of claim 1 wherein the operating range includes an unstable region, the unstable region being characterized as a pull-in condition.

9. The method of claim 1 wherein the predetermined time is a minimized time for the controlling and wherein the mirror device is subjected to a back bias voltage of 200 volts and less.

10. The method of claim 1 wherein the predetermined time is less than 5 milliseconds or less.

11. A method of switching optical signals using micro-mirror structures and control, the method comprising:

selecting an optical path for a micro-mirror device, the mirror device being coupled to a torsion bar device;

moving the micro-mirror device about a torsion bar device, the micro-mirror device being operated about the torsion bar device through an operating range, the micro-mirror device being subjected to a mechanical force from the torsion bar and being subjected to an electro-static force applied to the micro-mirror device and positioning the micro-mirror device to a selected switching location within the operating range to a selected region within a predetermined time; and controlling the micro-mirror device during a portion of time during the moving by receiving position signals periodically at a predetermined frequency from a sensing device coupled to the micro-mirror device, the position signals being indicative of a position of the operating range and selectively applying an electro-static force based upon one or more of the position signals such that the micro-mirror device is moved to the selected switching location to form the optical path without substantial oscillation of the micro-mirror device within the predetermined time of less than 10 milliseconds, wherein the substantial oscillation includes a predetermined frequency that may be damped and continues for an amount of time that exceeds milliseconds.

12. The method of claim 11 wherein the predetermined time is less than about 1 millisecond.

13. The method of claim 11 wherein the controlling reduces the electro-static forces from an electrode coupled to the micro-mirror device.

14. The method of claim 11 wherein the electro-static force and the torsion force are equal to zero at the selected switching location.

15. The method of claim 11 wherein the sensing device is selected from an optical sensor, mechanical sensor, or an electrical sensor.

16. The method of claim 11 wherein the selected frequency is 6 kHz and greater.

17. The method of claim 11 wherein the micro-mirror device has a mirror surface having a diameter of less than 3 millimeters.

18. The method of claim 11 wherein the controlling is provided at a time period of less than 20 microseconds.

19. The method of claim 11 wherein the operating range includes an unstable region, the unstable region being characterized as a pull-in condition.

20. The method of claim 11 wherein the predetermined time is a minimized time for the controlling and wherein the mirror device is subjected to a back bias voltage of 200 volts and less.

21. The method of claim 11 wherein the predetermined time is less than 5 milliseconds or less.

* * * * *